Patented July 25, 1933

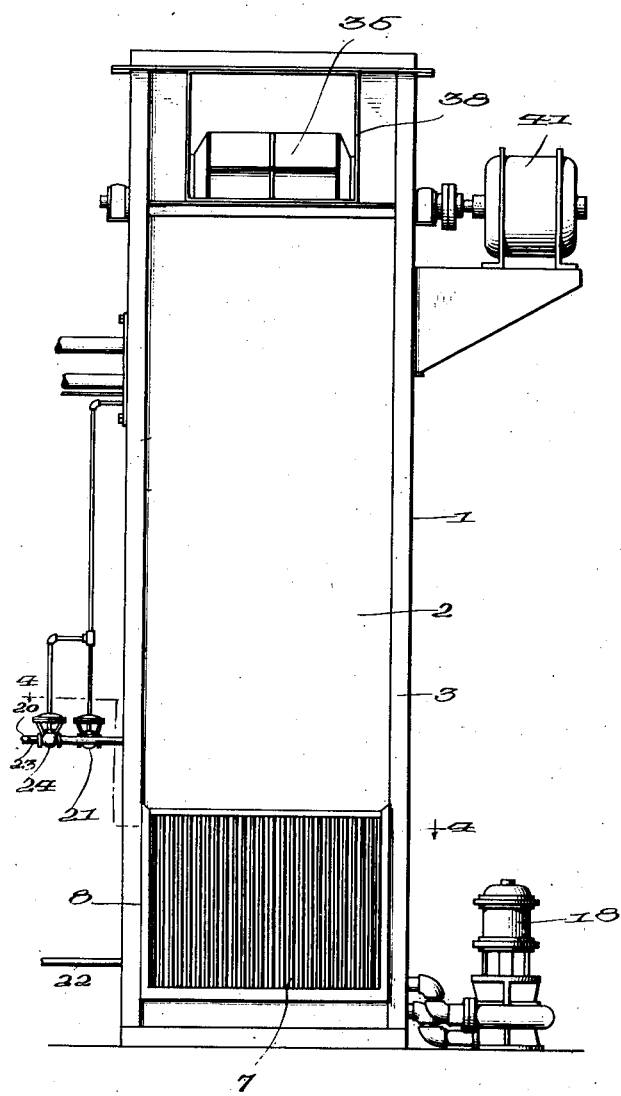

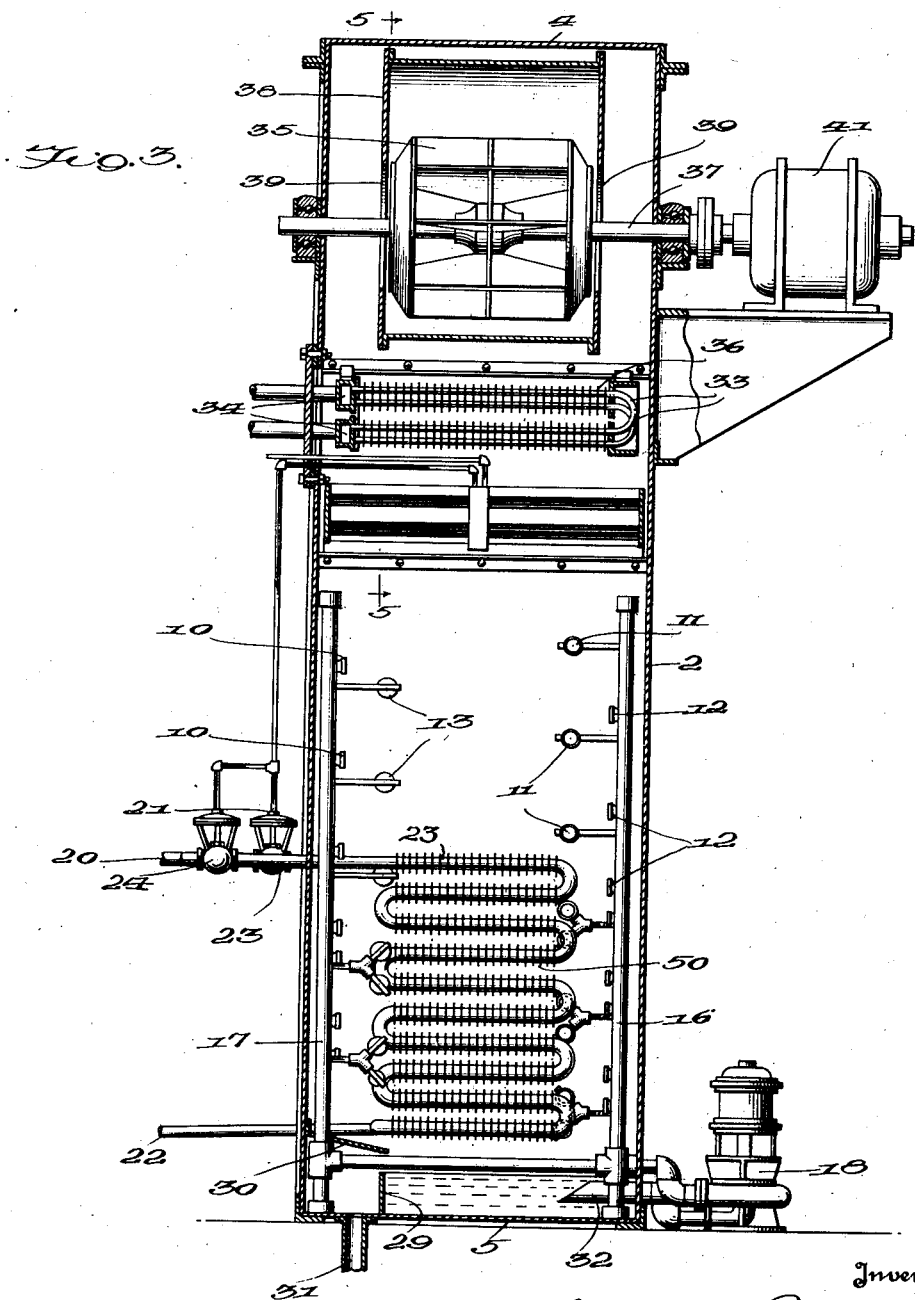

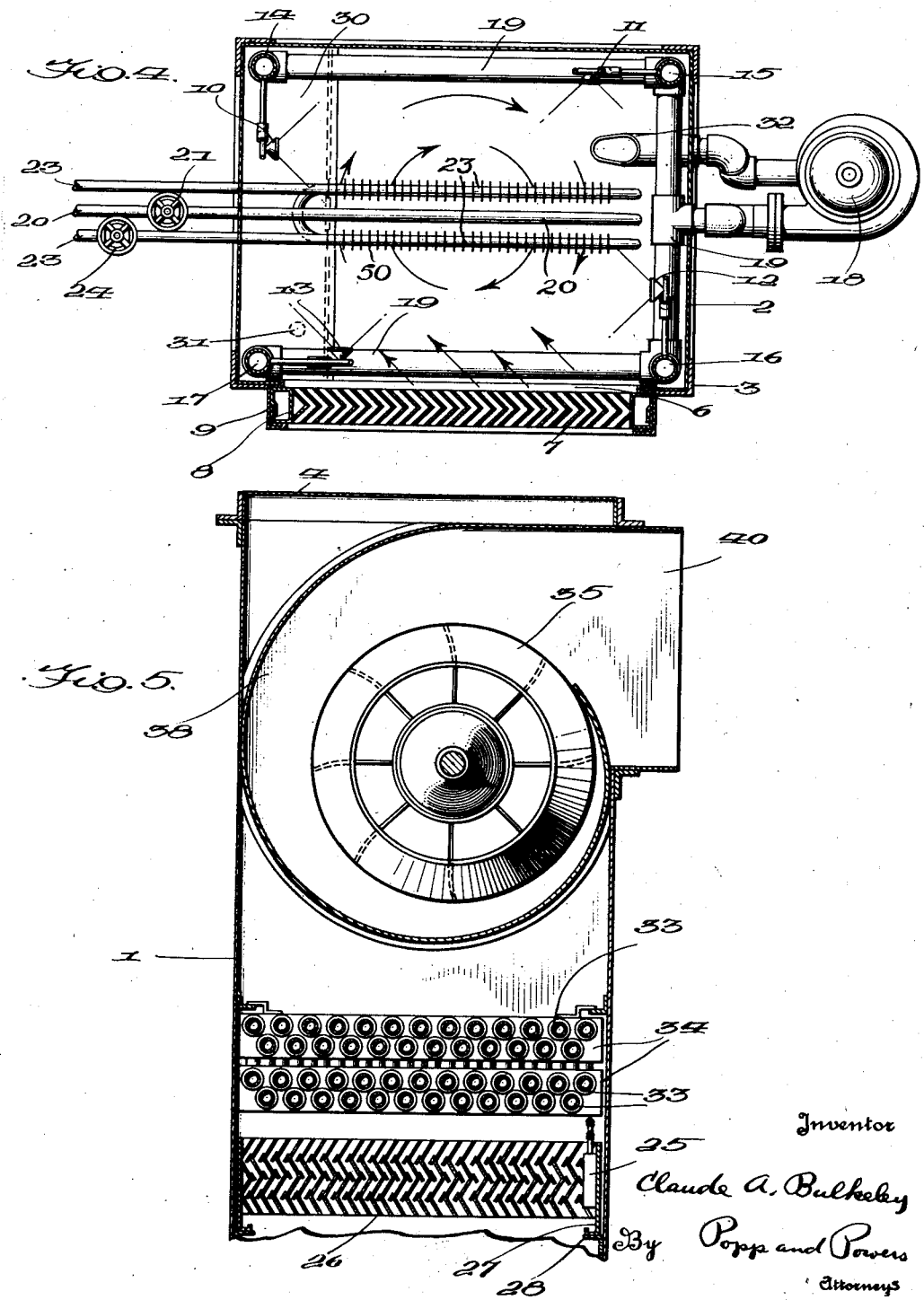

1,919,197

UNITED STATES PATENT OFFICE

CLAUDE A. BULKELEY, OF BUFFALO, NEW YORK, ASSIGNOR TO NIAGARA BLOWER COMPANY, OF BUFFALO, NEW YORK, A CORPORATION OF NEW YORK

AIR CONDITIONING SYSTEM

Application filed January 28, 1931. Serial No. 511,783.

This invention relates to an air conditioner for maintaining the desired temperature and relative humidity in the atmosphere of a room, and more particularly to the means for controlling the temperature of the air leaving the spray chamber.

One of the easiest ways to maintain a given temperature and relative humidity in the air of a room is to pass the air through a spray chamber in which it is subjected to sprays which saturate the air with water and also control the temperature which the air leaves in the spray chamber and thereby determines the dew point or amount of moisture which the air contains. The saturated air at its dew point after leaving the spray chamber is then heated to the temperature necessary to maintain the desired room temperature and is discharged into the room to maintain the proper relative humidity therein. For example, if a 70° dry bulb temperature and 70% relative humidity is the desired condition of the room atmosphere, if this air were cooled down to approximately 60° this same air would be saturated with water or have 100% relative humidity, as 60° is the dew point temperature. This is called the dew point because dew or moisture would be precipitated out of the air if the temperature were dropped below the 60° saturated temperature. Air will hold moisture in an amount depending on its temperature the higher the temperature the more moisture it will hold, the converse being true.

In air conditioning systems, as heretofore constructed, it has been the practice to vary the temperature of the spray water to obtain the desired dew point. The air leaving the spray chamber saturated with water is at the same temperature as the spray water and it is therefore apparent that by controlling the temperature of the spray water the temperature of the saturated air leaving the spray chamber can be controlled and since this temperature determines the amount of water in the saturated air the addition or removal of moisture from the air entering the spray chamber can be controlled by varying the temperature of the spray water. This necessitated employing both cooler and a heater in circuit with the pump circulating the spray water. If dehumidification were desired a coolant was passed through the cooler to lower the temperature of the spray water the desired extent to dehumidify and if humidification were desired heat was passed through the heater to heat the spray water the desired extent to add water to the air passing through the spray chamber. Such heating and cooling units are, of course relatively expensive.

It is one of the principal objects of the present invention to eliminate the necessity of both a heater and a cooler in the spray chamber recirculation system by providing heating and cooling coils directly in the spray chamber itself and by passing either a coolant or a heating medium through these coils as may be required to dehumidify or humidify the air passing through the spray chamber. The problem of heating the spray water in this manner is comparatively simple but the coolant employed must be very substantially below the freezing temperature of water and the coils must also have a relatively large amount of surface to be effective. One of the easiest ways to secure the large amount of surface is to provide a fin surfacing on the exposed pipe of the cooling coil. When fin surfacing is provided on a refrigerating pipe, however, and the pipe is exposed to any moisture the pipe soon ices up, the ice filling the space between the fins and thereby greatly reducing the exposed surface of the pipe and its efficiency as a heat transfer agent.

Another important object of the present invention therefore is to prevent such icing up of the cooling coil by arranging it so that it is subjected to the impinging of the spray water upon it and to a high velocity of both air and water so that it is impossible for ice to form between the fins of the cooling pipe by reason of its being constantly washed by relatively warm water and air at very high velocity.

Another important object is to provide such heating and cooling coils in a spray chamber in which a helical motion is imparted to the air by the sprays. This principle of helical movement of the air through a spray chamber is more specifically pointed out in my co-pending application, Ser. No. 301,479, filed August 23, 1928 for Air Conditioner, which has since matured into Patent No. 1,826,921 dated Oct. 13, 1931 and enables the height or effective length of the spray chamber to be reduced as much as one-quarter the length of standard spray chambers and still obtain saturation. According to the present invention the heating and cooling pipes in the spray chamber do not in any way interfere with the helical movement of the air as described in my said co-pending application.

In the accompanying drawings:

Figure 1 is a side elevational view of an air conditioner embodying my invention, Figure 2 is an elevational view of the left-hand side of the structure shown in Fig. 1.

Figure 3 is an enlarged vertical sectional view taken on line 3—3 of Fig. 2, looking in the direction of the arrows.

Figure 4 is an enlarged horizontal sectional view looking down on line 4—4 in Fig. 1, showing the pipes in place, and Figure 5 is an enlarged vertical sectional view of the upper part of the structure shown in Fig. 3, taken on line 5—5, looking in the direction of the arrows.

The elements directly affecting the air are housed within a housing or casing 1 through which the air to be conditioned passes, this housing or casing being shown as rectangular in form and composed of sheet metal sides 2 held by angle irons 3 and having a top 4 and a bottom 5. In the air conditioner shown the spray chamber is arranged in the lower part of the casing or housing and is provided with an air inlet 6 over which are arranged louvers 7 carried by a frame 8 removably supported in brackets 9 on the casing. These louvers are V-shaped in cross section, as best shown in Fig. 4, and serve two functions, one of which is to prevent the spray water from splashing out through the air inlet 6 and the other of which is to deflect the incoming air into the direction of the arrow shown in Fig. 4 and thereby initially kick the air into a helical path which is continued by the action and arrangement of the sprays in the spray chamber as hereinafter described.

The spray water is introduced into the spray chamber through spray nozzles 10, 11, 12 and 13 which are arranged, respectively, in a plurality of vertical series, groups or rows in the chamber adjacent the sides thereof. Each of these nozzles is mounted on a suitable branch pipe and the branch pipes supporting each series of nozzles are connected to vertically disposed spray water pipes 14, 15, 16 and 17, respectively, all of these vertically extending spray water pipes being connected to a pump 18 by pipes 19.

The number of nozzles employed is such as are required to secure saturation of the air leaving the spray chamber and to secure a true helical movement or swirling of the column of air ascending the spray chamber, the air being initially forced into such movement by the shape of the louvers 7. To secure this helical or swirling movement of the column of air ascending the spray chamber the nozzles of each row or series are directed horizontally toward the nozzles of the next succeeding series so that the sprays are disposed along the walls of the casing and toward one another. The nozzles are also preferably staggered relative to one another so that the nozzles of each succeeding series are arranged higher than the nozzles of the preceding series and thereby are, in effect, also arranged helically. By this arrangement it is apparent that the air entering the louvers 7 is initially directed to the left as viewed in Fig. 4. This air is then picked up by the first series of nozzles 13, directed to the nozzles 10, thence to the nozzles 11, thence to the nozzles 12 and so on, the column of air whirling about a vertical axis and rising in a helical path as indicated by the arrows in Fig. 4. It has been found that by so inducing a helical movement in the column of air ascending the spray chamber saturation can be obtained in a spray chamber as small as one-quarter the length of standard spray chambers now in use in which the sprays are directed against the flow of air or with the flow of air or in any other direction.

To control the temperature of the air leaving the spray chamber, the present invention proposes heating and cooling means located directly in the spray chamber and directly impinged by the sprays themselves and by the air passing through the spray chamber at high velocity. These heating and cooling means may be of various forms, but as shown the heating means comprise a steam pipe or coil 20 arranged centrally within the spray chamber, and the several coils thereof being in vertical alinement, the steam through this coil 20 being controlled by a direct acting diaphragm valve 21 in its inlet end and having a condensate drain 22 at its outlet, and the coolant, which is supplied at temperatures below the freezing point of water passes through the cooling means comprising a pair of connected cooling coils 23 arranged on opposite sides of the heating coil 20 and providing substantially greater surface than the heating coil. To cool the spray water and air passing at high velocity between the cooling coils it is necessary to have substantially more surface than is required in the heating coil and for this purpose not only are two cooling coils or substantially twice the length of cooling coils provided but the cooling coils are fin surfaced as indicated at 50. Brine or other suitable cooling medium is passed through the fin surfaced cooling coils, this brine being at a temperature substantially below the freezing point of water and the flow of brine through the cooling coils being controlled by a reverse acting diaphragm valve 24. The operation of the direct and reverse acting valves 21 and 24 are shown as regulated by a thermostat 25 located in the path of the air leaving the spray chamber so that the admission of a cooling medium or a heating medium is controlled in response to the temperature of the saturated air leaving the spray chamber. It is desirable, of course, that the diaphragm valves 21 and 24 be so set that they do not overlap in their action so as to mutually reduce the efficiency of heating or cooling the spray water and air.

Since the brine flowing through the fin surfaced cooling coils 23 is substantially below the freezing point of water it is obvious that under normal conditions these pipes would soon ice up and particularly with the use of fin surfacing which ice up between the fins and greatly reduce their efficiency as a cooling medium. To avoid this the cooling coils are arranged directly in the path of the sprays discharging spray water into the spray chamber so that they are constantly impinged by relatively warm water at high velocity and there is no opportunity for ice to start to form. At the same time these coils are arranged directly in the path of the whirling column of air ascending the spray chamber, the air also traveling at high velocity and impinging on the cooling coils so as to keep them washed free of any ice which might tend to form. It has been found in actual practice that the combination of spray water and air impinging on the fin surfaced cooling coil at high velocity entirely prevents the formation of ice and enables the cooling coils to operate at full efficiency. The use of fin surfacing, of course, enables the cooling coils to be greatly reduced in length and also provide less obstruction to the whirling or helical movement of the air. It has been found that with heating and cooling pipes located as shown, the helical action or movement of the air is not interfered with and that the advantage of a shorter spray chamber, as outlined in my said co-pending application, Ser. No. 301,479 is not interfered with. Above the spray chamber is arranged an eliminator composed of louvers 26 supported in a removable frame 27 on brackets 28 on the inner walls of the casing. Passage of the saturated air through the zig-zag louvers 26 results in the elimination of excess water entrained in the air leaving the spray chamber, this removed entrained water either dripping directly into a sump formed on the bottom of the casing by a weir 29 and the side walls 2 or draining into the sump from an inclined baffle 30 which projects over the drain pipe 31 in the bottom of the casing. Water from the sump is pumped out through a pipe 32 and recirculated by the pump 18 to the spray water pipes and spray nozzles. To raise the temperature of the saturated air the required extent to heat the room to the desired temperature and also to secure the desired relative humidity by means of the saturated air leaving the spray chamber eliminator 26 a heater of any suitable form and shown as composed of hairpin tubes connected to headers 34 is arranged in the upper end of the casing above the eliminator 26 and through which the saturated air leaving the spray chamber is forced to pass. These hairpin tubes are preferably fin surfaced as indicated at 36 and the steam passing through this heater can be controlled in any suitable manner to obtain the desired temperature within the room. The air is drawn through the spray chamber eliminator and heater by means of a fan 35 of any suitable construction, the fan 35 being shown as mounted on a shaft 37 and enclosed in a fan housing 38 having its inlet openings 39 communicating with the interior of the casing and its outlet 40 projecting out through the casing and delivering the air back into the room. The fan shaft 37 is suitably journaled in the walls of the casing 1 and is driven by a motor 41. In operation the fan 35 draws air through the inlet opening 6, past the louvers 7, past the heating coils 20 and cooling coils 23, past the spray issuing from the nozzles 10, 11, 12 and 13, through the eliminator 26 and heating coils 33 and discharges it into the room. In so passing through the inlet louvers 7 the air is initially kicked in a proper direction to start it in its helical path and this movement of the air is picked up and maintained by the spray nozzles which are disposed to whirl the ascending column of air in the spray chamber and cause it to traverse a helical path. In so doing both the air and the spray water impinge upon the heating and cooling coils 20 and 23 at high velocity, thereby absorbing or transferring heat and in the case of the cooling coils preventing the formation of ice upon the same. Cooling and heating mediums are alternately passed through the cooling and heating coils as may be required in dehumidifying or humidifying the air. The heating or cooling coils raise or lower the saturated temperature of the air the desired extent to provide the desired relative humidity of the air in the room and after being heated by the heating pipes 33 above the spray chamber is returned to the room.

As a whole this invention provides a means for cooling or heating the air passing through a spray chamber and obtaining the desired temperature of the saturated air leaving the spray chamber without employing a separate heating and cooling unit in the spray water recirculation system. Furthermore by arranging the cooling coils so as to be directly impinged by the air and water at high velocity the formation of ice is entirely prevented and the cooling coil can be provided with fin surfacing and will operate at full efficiency at all times. Furthermore, the helical action of the air through the spray chamber which obtains the saturation of the air in a very short spray chamber as described in my said co-pending application, Ser. No. 301,479 is not interfered with by placing heating and cooling coils directly in the spray chamber in the manner described.

I claim as my invention:

1. In a conditioner for saturating gas with a liquid, a spray chamber, means for forcing a current of gas from one end of said spray chamber to the other, a cooling coil arranged in said spray chamber, means for spraying liquid at high velocity from the opposite sides of said coil and to impinge upon said coil and means for passing a refrigerated fluid through said coil to vary its temperature.

2. In a conditioner for saturating gas with a liquid, a spray chamber, means for forcing a current of gas from one end of said spray chamber to the other, a heating coil arranged centrally of said chamber, a cooling coil arranged on opposite sides of said heating coil, means for spraying liquid through said current of gas and to impinge upon said coils, and means controlling the admission of heating and cooling media to said coils.

3. In a conditioner for saturating gas with a liquid, a spray chamber, means for forcing a current of gas from one end of said spray chamber to the other, a heating coil consisting of a series of spaced apart pipes arranged in the same general plane and in a plane extending centrally and longitudinally through said spray chamber, a cooling coil consisting of a series of spaced apart pipes arranged on each side and parallel with the said heating coil, means for spraying liquid through said current of gas and to impinge upon said coils and means controlling the admission of heating and cooling media to said coils.

4. In a conditioner for saturating gas with a liquid, a spray chamber, means for forcing a current of gas from one end of said spray chamber to the other, a cooling coil consisting of a series of spaced apart pipes having closely spaced radially extending fins and arranged in said spray chamber, means for spraying liquid through said current of gas and in a direction substantially perpendicular to said pipes, said liquid thereby impinging directly on said pipes between said fins and means for passing a coolant through said coil.

5. In a conditioner for saturating gas with a liquid, a spray chamber, means for forcing a current of gas from one end of said spray chamber to the other, a coil arranged in said spray chamber, means for spraying liquid from the sides of said current of gas and to impinge upon said coil and said spraying means being also arranged to deflect said current of gas to traverse a helical path through said spray chamber and means for passing a fluid through said coil to vary its temperature.

6. In a conditioner for saturating gas with a liquid, a spray chamber, means for forcing a current of gas from one end of said spray chamber to the other, a coil consisting of a series of spaced apart pipes arranged in the same general plane and in a plane extending longitudinally of said spray chamber, means for spraying liquid from the sides of said current of gas and said spraying means being also arranged to deflect said current of gas to traverse a helical path through said spray chamber, and to impinge upon said coil, and means for passing a fluid through said coil to vary its temperature.

7. In a conditioner for saturating gas with a liquid, a spray chamber, means for forcing a current of gas from one end of said spray chamber to the other, a heating coil arranged centrally of said chamber, a cooling coil arranged on opposite sides of said heating coil, means for spraying liquid from the sides of said current of gas to impinge upon said coils and said spraying means being also arranged to deflect said current of gas to traverse a helical path through said spray chamber and means controlling the admission of heating and cooling media to said coils.

8. In a conditioner for saturating gas with a liquid, a spray chamber, means for forcing a current of gas from one end of said spray chamber to the other, a heating coil consisting of a series of spaced apart pipes arranged in the same general plane and in a plane extending centrally and longitudinally through said spray chamber, a cooling coil consisting of a series of spaced apart pipes arranged on each side and parallel with the said heating coil, means for spraying liquid from the sides of said current of gas and to impinge upon said coils and said spraying means being also arranged to deflect said current of gas to traverse a helical path through said spray chamber and means controlling the admission of heating and cooling media to said coils.

9. In a conditioner for saturating gas with a liquid, a spray chamber, means for forcing a current of gas through said spray chamber, means for spraying liquid into the current of gas passing through said spray chamber, a fin surfaced cooling coil arranged in said spray chamber and impinged by the spray liquid and said gas and said spraying means being also arranged to deflect said current of gas to traverse a helical path through said spray chamber and means for passing a cooling fluid through said coil.

10. In a conditioner for saturating gas with a liquid, a spray chamber, means for forcing a current of gas from one end of said spray chamber to the other, a heating coil arranged in said chamber, a cooling coil arranged in said spray chamber adjacent said heating coil, means for spraying liquid through said current of gas and to impinge upon said coils, and means controlling the admission of heating and cooling media to said coils.

CLAUDE A. BULKELEY.